(12) United States Patent
Lange et al.

(10) Patent No.: US 6,362,923 B1
(45) Date of Patent: Mar. 26, 2002

(54) LENS FOR MICROSCOPIC INSPECTION

(75) Inventors: Steve R. Lange, Alamo, CA (US); David Shafer, Fairfield, CT (US)

(73) Assignee: KLA-Tencor, San Jose, CA (US)

( * ) Notice: Subject to any disclaimer, the term of this patent is extended or adjusted under 35 U.S.C. 154(b) by 0 days.

(21) Appl. No.: 09/602,920

(22) Filed: Jun. 23, 2000

Related U.S. Application Data

(60) Provisional application No. 60/188,309, filed on Mar. 10, 2000.

(51) Int. Cl.[7] .............................................. G02B 15/14
(52) U.S. Cl. ..................... 359/689; 359/645; 359/661; 359/676; 359/354; 359/357; 359/365
(58) Field of Search ................................ 359/351, 354, 355, 357, 364, 365, 432, 642, 645, 661, 689, 676, 726, 727, 729

(56) References Cited

U.S. PATENT DOCUMENTS

| | | | | |
|---|---|---|---|---|
| 5,004,331 A | * | 4/1991 | Haseltine et al. | 359/728 |
| 5,031,976 A | | 7/1991 | Shafer et al. | 359/355 |
| 5,089,910 A | * | 2/1992 | Sigler | 359/357 |
| 5,114,238 A | * | 5/1992 | Sigler | 359/357 |
| 5,717,518 A | | 2/1998 | Shafer et al. | 359/357 |
| 5,940,222 A | * | 8/1999 | Sinclair et al. | 359/689 |
| 5,956,174 A | | 9/1999 | Shafer et al. | 359/357 |
| 5,999,310 A | | 12/1999 | Shafer et al. | 359/351 |

* cited by examiner

*Primary Examiner*—Loha Ben
(74) *Attorney, Agent, or Firm*—Beyer Weaver & Thomas, LLP

(57) ABSTRACT

An optical system comprising three lens sections, a catadioptric objective lens section, a reimaging lens section and a zoom lens section, which are all aligned along the optical path of the optical system. The reimaging lens section re-images the system pupil such that the re-imaged pupil is accessible separately from any of the lens sections. The reimaging lens section includes an intermediate focus lens group, which is used to create an intermediate focus, a recollimating lens group, which is used to recollimate the light traveling from the intermediate focus lens group, refocusing group to generate the re-image of the pupil. The optical system may also include a beamsplitter, which creates a separated illumination pupil and collection pupil. The illumination pupil and the collection pupil may then be manipulated with an illumination aperture and a collection aperture, respectively, so that the optical system may operate in various test modes such as brightfield, ring darkfield, full-sky illumination, and laser darkfield with Fourier filtering capability. Another aspect of the invention pertains to a method for using the broad spectral region catadioptric optical system. The method includes the operations of directing radiation from a radiation source so that the radiation passes through the illumination pupil and the collection pupil of the optical system. The method also includes operations for configuring the illumination pupil and the collection pupil so that the optical system may operate in brightfield, ring darkfield, full-sky or laser darkfield illumination mode, with Fourier filtering capability.

30 Claims, 5 Drawing Sheets

LENS FOR MICROSCOPIC INSPECTION

"This application claims the benefit of U.S. Provisional Application No. 60/188,309 filed on Mar. 10, 2000 the disclosure of which is incorporated herein by reference."

FIELD OF THE INVENTION

The present invention relates generally to a catadioptric imaging microscope system, and more specifically to an imaging system that is capable of reimaging its system pupil to a location outside of the catadioptric objective lens section.

BACKGROUND

Generally, the industry of semiconductor manufacturing involves highly complex techniques for integrating circuits into semiconductor materials. Due to the large number of processing steps and the decreasing size of semiconductor devices, the semiconductor manufacturing process is prone to processing defects that decrease device yields. Testing procedures to eliminate these processing defects from the processing steps are therefore critical for maintaining high yielding production facilities. Since the testing procedures are an integral and significant part of the manufacturing process, the semiconductor industry constantly seeks more sensitive and efficient testing procedures.

One type of testing system uses optical imaging technology to create an image of a semiconductor wafer or die. The image is then inspected to detect defects on the semiconductor wafer or die. One type of imaging system, a catadioptric imaging system for the deep ultraviolet spectral region (about 0.23 to 0.37 micron wavelength) is disclosed by U.S. Pat. No. 5,031,976 to Shafer and U.S. Pat. No. 5,488,229 to Elliot and Shafer. These systems employ the Schupmann achromatic lens principle and the Offner-type field lens. A catadioptric imaging system with added wide-range zoom capabilities is disclosed in U.S. Pat. No. 5,999,310 to Shafer et al. In addition to the zooming capability, the system disclosed in U.S. Pat. No. 5,999,310 has a high numerical aperture and performs in the ultra-broad band spectral region.

Even though the catadioptric imaging systems provide images having excellent quality, the systems are limited with respect to the number of testing modes in which they may operate. This results from the fact that the system pupil is located within the catadioptric lens section of the imaging system. The ability to access the system pupil with enough space around it to allow for the insertion of a beamsplitter, so that an illumination light path may be separated from a collection light path, would give the system the ability to operate under additional optical inspection modes. The imaging system is configured to operate under these additional inspection modes by selectively controlling the amount and/or the pattern of light travelling along these light paths. These modes, in turn, allow the imaging system to operate with greater detection sensitivity. However, since the system pupil in the current imaging systems is located within the catadioptric lens section, it is difficult to access, thereby making the systems difficult to configure. Attempts to use the buried pupil for different imaging modes causes separation between the illumination aperture and the collection aperture. This results in a magnification and position difference between them. This means that any attempt to economically position light between the apertures results in light loss because the apertures must be sized to minimize interference between the optical signals (crosstalk).

Another drawback of the current systems is that they are not capable of operating in a telecentric mode for either ring darkfield or full-sky illumination/collection modes. Being non-telecentric means that the imaged appearance of a wafer structure at the center of the field of view will be different from the appearance of the same structure at the edge of the field of view. This is due to the difference between the angle in which light is incident upon the structures and the angle from which the structures are viewed.

Yet another drawback to the current systems lies in the fact that the pupil plane is aberrated. These aberrations cause two unwanted effects at the pupil. The first effect is that of an increased spot size compared to an unaberrated spot, and the second is an error in the location of the spot relative to where it should be located (distortion). The availability of a high-quality pupil plane allows for Fourier filtering, which is effective in increasing defect detection sensitivity for certain periodic wafer structures. Fourier filtering will not be possible unless the Fourier plane has sufficient quality and is physically accessible to allow the insertion of a mechanical Fourier filter.

In view of the of the foregoing, an optical imaging system having a pupil which is physically accessible, which is able to operate in a telecentric mode, is configurable to operate in various optical testing modes to obtain high degrees of defect detection sensitivity, and allows for more accurate Fourier filter testing would be desirable.

SUMMARY

The present invention is directed to a broad spectral region catadioptric optical system that allows for easy access to its pupil, is able to operate in a "telecentric-in-object-space" mode for ring darkfield and full-sky illumination modes, and allows for more accurate Fourier filtering. One aspect of the invention pertains to an optical system which includes three lens sections, a catadioptric objective lens section, a reimaging lens section and a zoom lens section, which are all aligned along the optical path of the optical system. The reimaging lens section re-images the system pupil such that the re-imaged pupil is accessible separately from any of the lens sections. In one embodiment, the reimaging lens section includes an intermediate focus lens group, which is used to create an intermediate focus, a recollimating lens group, which is used to recollimate the light traveling from the intermediate focus lens group, and a refocusing lens group, which generates the re-image of the pupil. The optical system may also include a beamsplitter, which creates a separated illumination pupil and collection pupil. The illumination pupil and the collection pupil may then be manipulated with an illumination aperture and a collection aperture, respectively, so that the optical system may operate in various test modes such as brightfield, ring darkfield and full-sky illumination. The reimaging lens section also allows the system to be configured to operate in laser darkfield mode.

Another aspect of the invention pertains to a method for using the broad spectral region catadioptric optical system. The method includes the operations of directing radiation from a radiation source so that the radiation passes through the illumination pupil and the collection pupil of the optical system. The method also includes operations for configuring the illumination pupil and the collection pupil so that the optical system may operate in brightfield, ring darkfield and full-sky illumination modes.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
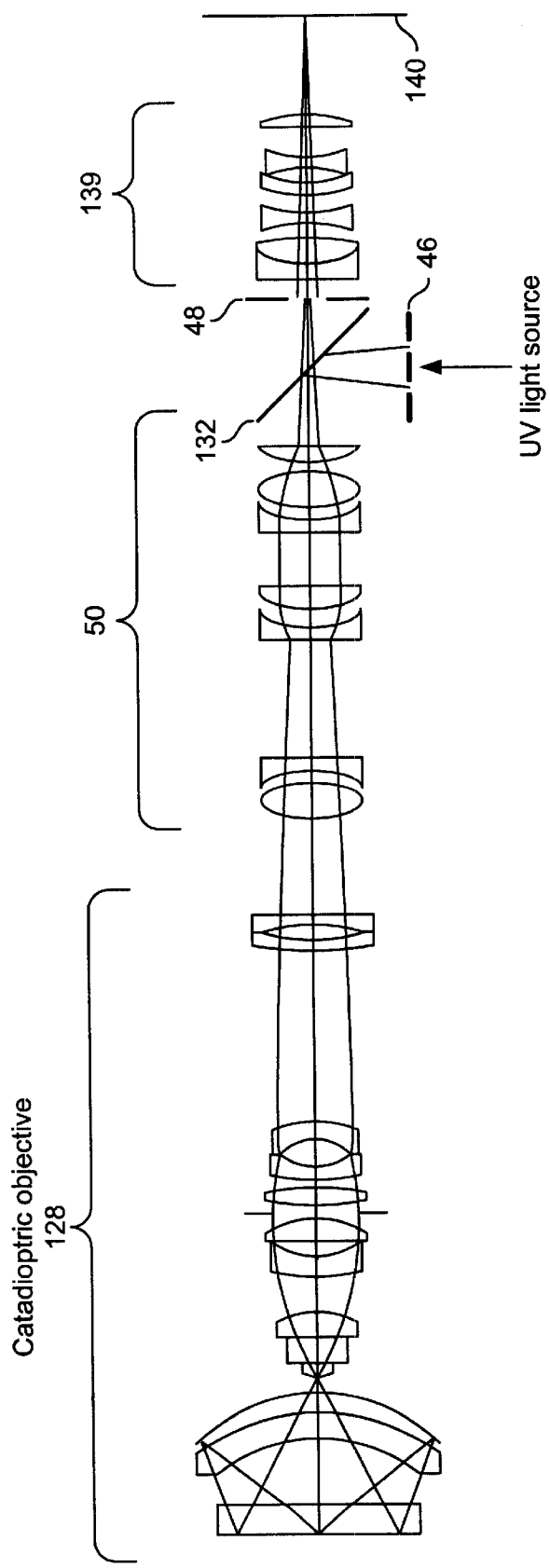
FIG. 1 illustrates a schematic side view of the optical system of the present invention according to one embodiment.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

The optical system of the present invention is an optical system that creates an image of the system pupil outside of the objective lens section. The optical system 10 according to one embodiment of the present invention, illustrated in FIG. 1, includes a reimaging lens section 50, which is located between a catadioptric lens section 128 and a zoom lens section 139. The catadioptric objective lens section 128 is generally placed proximate to the specimen to be inspected by the optical system 10. The system pupil is generally located within the objective lens section 128, and it usually lies within one of the lenses of the objective lens section 128. Generally, the system pupil is likely to be highly aberrated, curved and distorted. The reimaging lens section 50 may be used to create an image of the system pupil outside of the objective lens section 128 (this is referred to as "reimaging the pupil"). The re-imaged pupil is created within a pupil plane 48, which is located between the reimaging lens section 50 and the zoom lens section 139. The zoom lens section receives the image of the specimen, thereby allowing the re-imaged pupil to lie before the final image. Additionally, the zoom lens section 139 provides the ability to adjust the magnification of the image 140 and may be used to correct optical aberrations of the whole system. The optical system of the present invention may be used with various lighting methods, such as deep ultraviolet lighting or visible lighting methods.

In FIG. 1, a collection pupil and an illumination pupil are created by placing a beamsplitter between the reimaging lens section 50 and the pupil plane 48. The collection pupil and the illumination pupil may then be manipulated so that the optical system 10 may operate in various test modes. These test modes include, but are not limited to brightfield, ring darkfield, full-sky illumination. The pupil plane 48 is also a Fourier plane useful for filtering out repetitive structure patterns when illuminated with a coherent source. Techniques and apparatus for creating and using a collection pupil and an illumination pupil are described further below.

Figure 2:
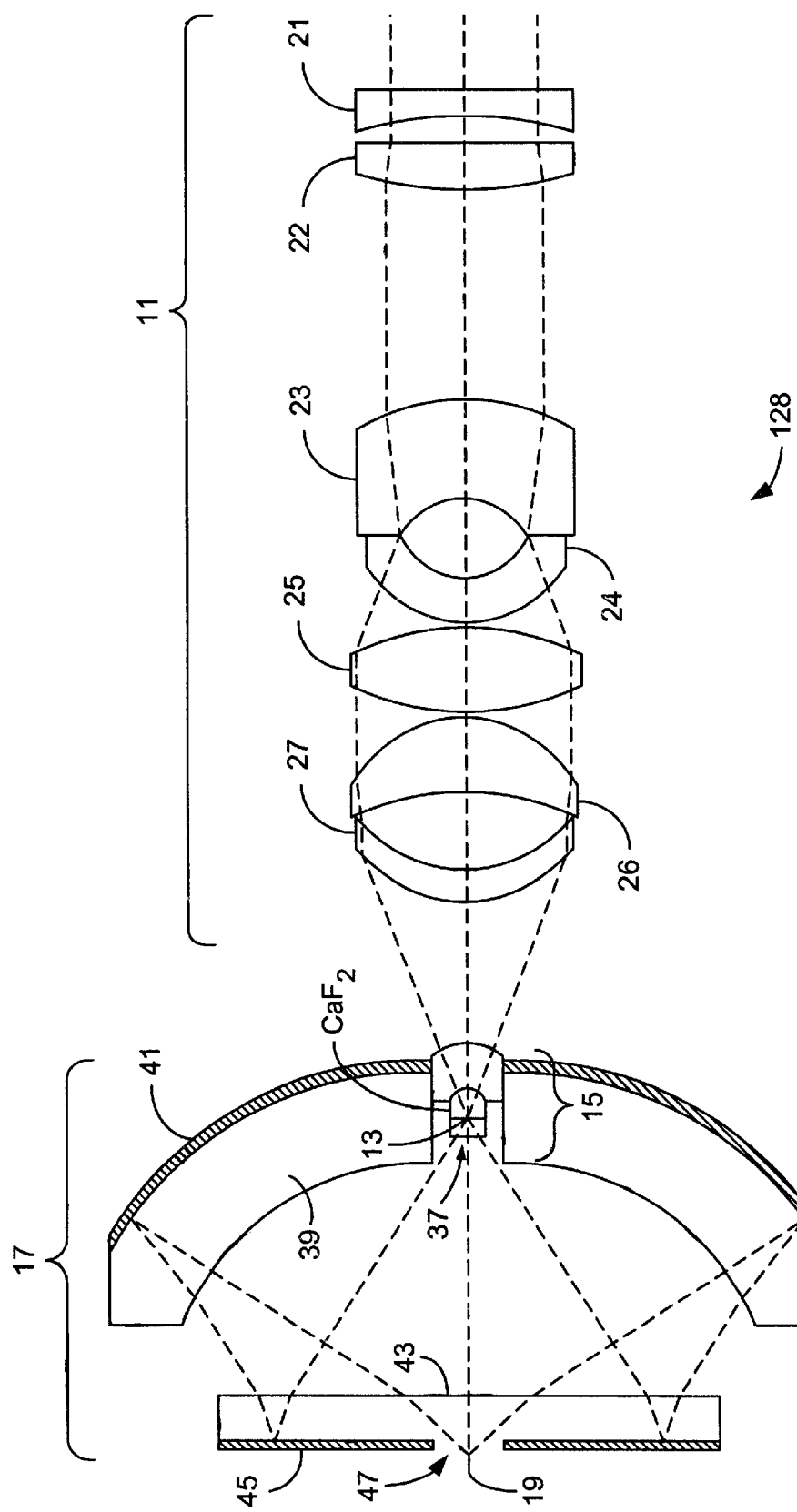
FIG. 2 illustrates a detailed schematic side view of one embodiment of a catadioptric objective lens section.

FIG. 2 shows the catadioptric objective lens section 128 according to one embodiment of the invention in greater detail. In the illustrated embodiment, the catadioptric objective lens section 128 is made up of a focusing lens group 11 for forming an intermediate image 13, a field lens group 15 disposed proximate to the intermediate image 13 to a final image 19. The objective lens section 128 may be optimized to correct both monochromatic (Seidel) aberrations and chromatic aberrations (longitudinal and lateral), as well as chromatic variations of the monochromatic aberrations, over a wavelength band that extends into the deep ultraviolet (UV) portion of the spectrum, covering 0.23 to 0.37 micron UV light. The catadioptric objective lens section 128 may be any suitable arrangement for use in broadband deep ultraviolet applications. This objective lens section 128 can be adapted for any suitable UV imaging application, such as a UV microscope objective, a collector of surface scattered UV light in a wafer inspection apparatus, or as mask projection optics for a UV photolithography system.

The focusing lens group 11 in FIG. 2 consists of seven lens elements 21–27, with two of the lens elements (21 and 22) separated by a substantial distance from the remaining five lens elements (23–27). The separation of the pair of lens elements 21 and 22 from the remaining five lens elements 23–27 is typically on the order of at least one-half the total combined thickness of the five lens elements 23–27. For example, lens elements 23–27 may span a distance of about 60 millimeters (mm) and lens element 22 may be 30 to 60 mm from lens element 23. The actual dimensions depend on the scale chosen for the embodiment. The two lenses 21 and 22 form a low power doublet for correcting chromatic variation of monochromatic image aberrations, such as coma and astigmatism. By having this doublet, 21 and 22, relatively far from the other system components, the shift of the light beam with field angles on these two lenses is maximized. That in turn helps greatly in achieving the best correction of chromatic variation of aberrations.

The five lenses 23–27 of the main focusing subgroup consist of a thick strong negative meniscus lens 23, an opposite-facing strongly-curved negative meniscus lens 24, a strong bi-convex lens 25, a strong positive meniscus lens 26, and an opposite-facing strongly-curved, but very weak, meniscus lens 27 of either positive or negative power. Variations of this lens 23–27 subgroup are possible. The subgroup focuses the light to an intermediate image 13. The curvature and positions of the lens surfaces are selected to minimize monochromatic aberrations and to cooperate with the doublet 21–22 to minimize chromatic variations of those aberrations.

The field lens group 15 typically comprises an achromatic triplet, although any achromatized lens group can be used. Both fused silica and $CaF_2$ glass materials are used. Other possible deep UV transparent refractive materials can include $MgF_2$, $SrF_2$, $LaF_3$ and LiF glasses, or mixtures thereof. In addition to refractive materials, diffractive surfaces can be used to correct chromatic aberrations. Because the dispersions between the two UV transmitting materials, $CaF_2$ glass and fused silica, are not very different in the deep ultraviolet, the individual components of the group 15 have strong curvatures. Primary color aberrations are corrected mainly by the lens elements in the catadioptric relay group 17 in combination with the focusing lens group 11. Achromatization of the field lens group 15 allows residual lateral color to be completely corrected.

The catadioptric relay group 17 of FIG. 2 includes a fused silica meniscus lens 39 with a back surface having coating 41, and fused silica lens 43 with a back surface having a reflective coating 45. The two lens elements 39 and 43 have front surfaces, which face each other. The reflective surface coating 41 and 45 are typically aluminum, possibly with a dielectric overcoat to enhance reflectivity.

The first lens 39 has a hole 37 centrally formed therein along the optical axis of the system. The reflective coating 41 likewise ends at the central hole 37 leaving a central optical aperture through which light can pass unobstructed by either the lens 39 or its reflective coating 41. The optical aperture defined by the hole 37 is in the vicinity of the intermediate image plane 13 so that there is minimum optical loss. The achromatic field lens group 15 is positioned in or near the hole 37. The second lens 43 does not normally have a hole, but there is a centrally located opening or window 47 where the coating is absent on the surface reflective coating 45. The optical aperture in lens 39 with its reflective coating 41 need not be defined by a hole 37 in the lens 39, but could be defined simply by a window in the coating 41 as in coating 45. In that case, light would pass one additional time through the refractive surfaces of lens 39.

Light from the source transmitted along the optical axis toward the intermediate image plane 13 passes through the optical aperture 37 in the first lens 39 and then through the body of the second lens 43 where it is reflected by the near planar (or planar) mirror coating 45 back through the body of the second lens 43. The light then passes through the first lens 39, is reflected by the mirror surface 41 and passes back through the first lens 39. Finally the light, now strongly convergent, passes through the body of the second lens 43 for a third time, through the optical aperture 47 to the target image plane adjacent aperture 47. The curvatures and positions of the first and second lens surfaces are selected to correct primary axial and lateral color in conduction with the focal lens group 11. For further details regarding ultraviolet catadioptric imaging systems, refer to U.S. Pat. No. 5,999,310 to Shafer et al. and to U.S. Pat. No. 5,717,518 to Shafer et al., which are hereby incorporated by reference in their entirety.

Figure 3:
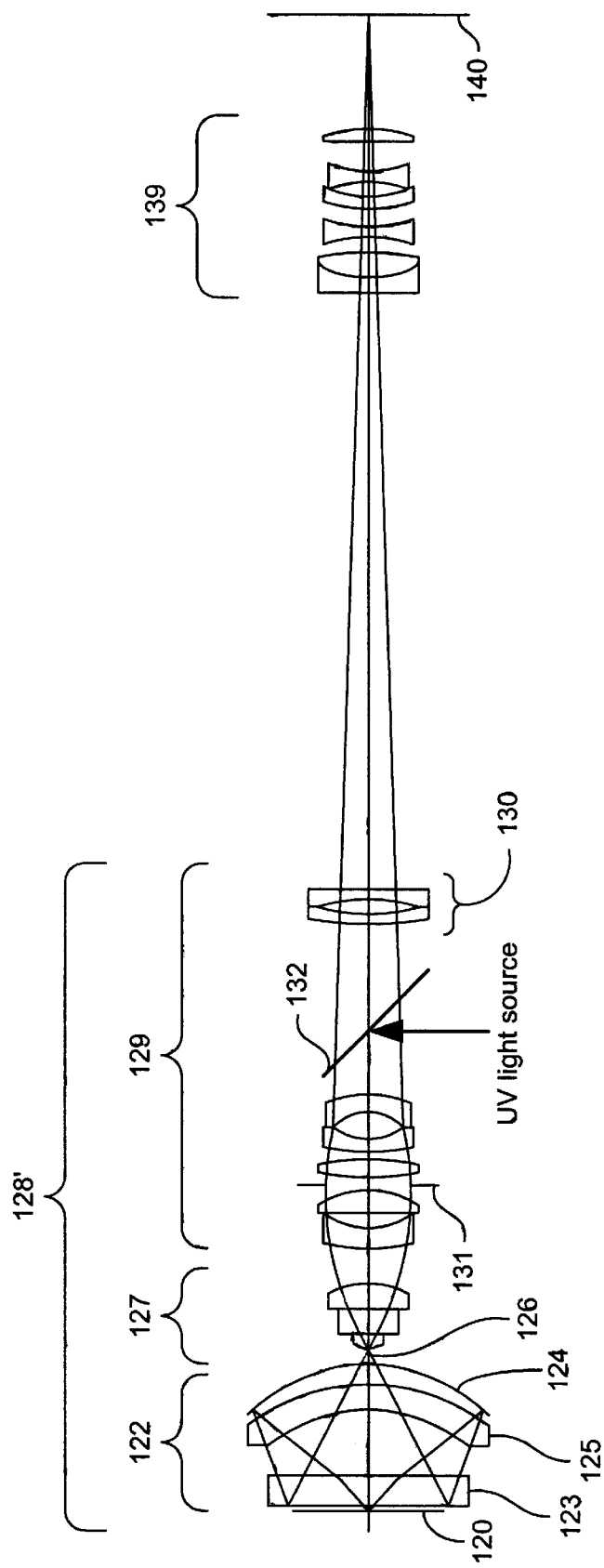
FIG. 3 illustrates a schematic side view of an optical system that includes a catadioptric objective lens section and a zoom lens section.

FIG. 3 illustrates the optical system shown in FIG. 1 without the reimaging lens section 50 to better illustrate the other components of the optical system. The optical system illustrated in FIG. 3 includes a catadioptric objective lens section 128', according to an alternative embodiment of the invention, together with a zoom lens section 139. The catadioptric objective lens section 128' includes a catadioptric lens group 122, a field lens group 127 and a focusing lens group 129. The beamsplitter 132 provides an entrance for the UV light source. The aperture stop 131 is used to adjust the system imaging numerical aperture (NA). The microscope system images an object 120 (e.g., a wafer being inspected) to the image plane 140.

The catadioptric objective section 128' is optimized for ultra-broadband imaging in the UV spectral region (about 0.23 to 0.37 micron wavelength). For example, the invention may use the Schupmann principle in combination with an Offner field lens to correct for axial color and first order lateral color, and an achromatized field lens group to correct the higher order lateral color. The elimination of the residual higher order chromatic aberrations make the ultra-broadband UV objective design possible.

The catadioptric lens group 122 includes a near planar (or planar) reflector 123, which is a reflectively coated lens element, a meniscus lens 125, and a concave spherical reflector 124. The reflective element has a central optical aperture without reflective material to allow light from the intermediate image plane 126 to pass through the concave reflector, be reflected by the near planar (or planar) reflector 123 onto the concave reflector 124, and pass back through the near planar (or planar) reflector 123, traversing the associated lens element or elements on the way.

The achromatic multi-element field lens group 127 is made from two or more different refractive materials, such as fused silica and fluoride glass, or diffractive surfaces. The field lens group 127 may be optically coupled together or alternatively may be spaced slightly apart in air. Because fused silica and fluoride glass do not differ substantially in dispersion in the deep ultraviolet range, the individual powers of the several component element of the field lens group need to be of high magnitude. Use of such an achromatic field lens allows the complete correction of axial color and lateral color over an ultra-broad spectral range. In the simplest version of the design, only one field lens component need be of a refractive material different than the other lenses of the system.

The zoom lens section 139 is first corrected independently of the catadioptric objective 128, using two refractive materials (such as fused silica and calcium fluoride). Zoom lens section 139 is then combined with the catadioptric objective 128 and then the catadioptric objective is modified to compensate for the residual higher-order chromatic aberrations of the zooming lens system. This is possible because of the design features of the field lens group 127 and the low power lens group 130 of the catadioptric objective described earlier. The combined system is then optimized with all parameters being varied to achieve the best performance.

The zoom lens section 139 may have any suitable arrangement. For example, the zoom lens section may move relative to a fixed detector array position. Alternatively or additionally, linear zoom motion may be provided by a moving detector array position. By way of another example, in addition to zoom lenses, folding mirrors may be utilized to reduce the physical length of the imaging system and fix the detector array position. The zoom lens section 139 may be composed of a single zoom lens or a set of one or more tube lenses. For further details regarding the zoom lens, including information on its various embodiments, see U.S. Pat. No. 5,999,310 to Shafer et al.

Figure 4:
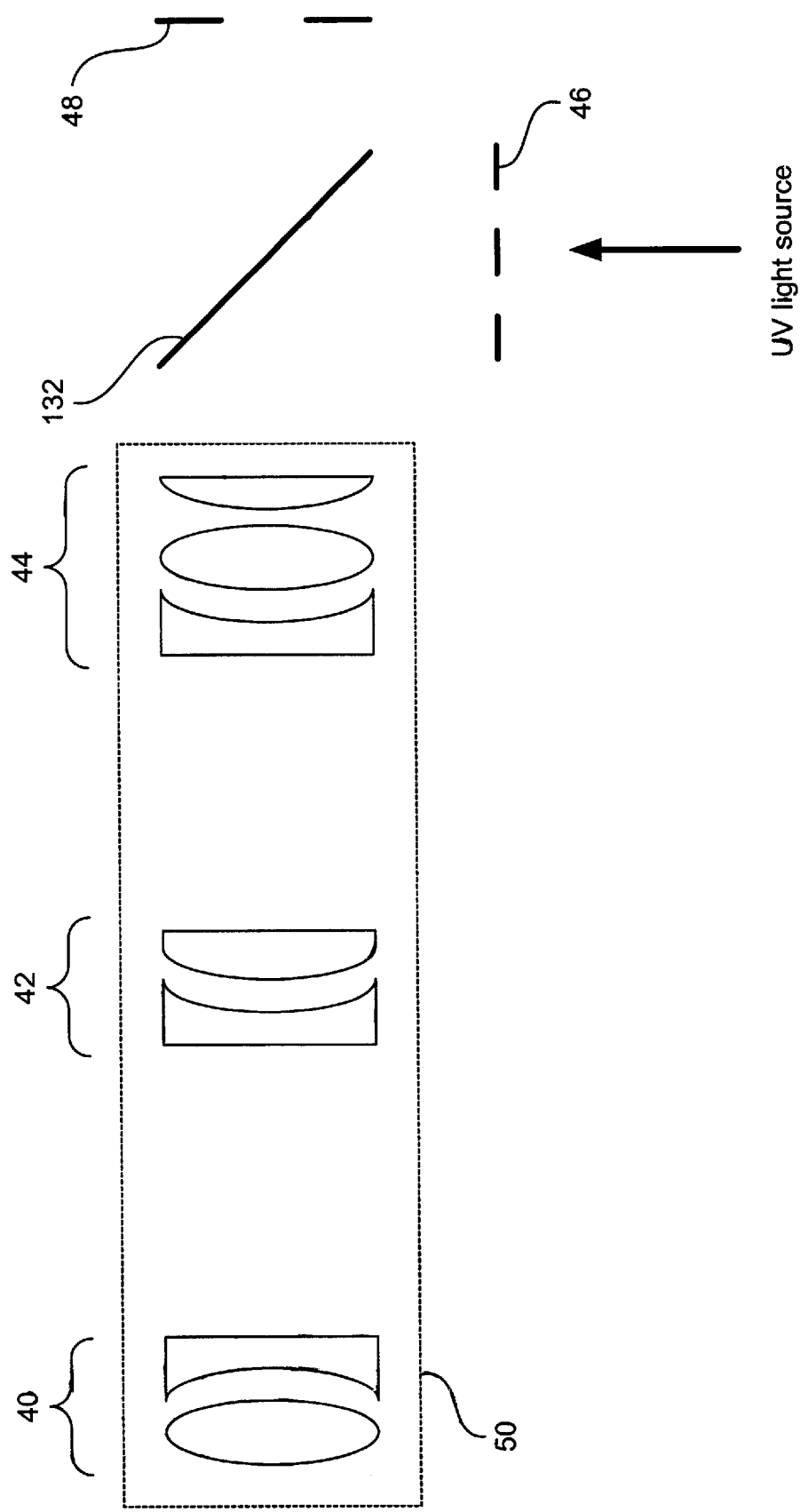
FIG. 4 illustrates a detailed schematic side view of a reimaging lens section of the present invention according to one embodiment.

FIG. 4 illustrates the reimaging lens section 50 of FIG. 1 in accordance with one embodiment of the present invention. The reimaging lens section 50 includes three groups of lens 40, 42 and 44. The intermediate focus lens group 40 receives the collimated rays traveling from the objective lens section 128 and creates an intermediate focus image, which is needed in order to ultimately create the re-imaged pupil. The recollimating lens group 42, which is located between lens groups 40 and 44, receives the rays traveling from lens group 40, which are no longer collimated. Lens group 42 recollimates these rays. The refocusing lens group 44 generates the re-image of the pupil. All three lens groups 40, 42 and 44 serve to correct various aberrations, such as coma and stigmatism. The re-imaged pupil plane 48 is located along the path of the rays exiting lens group 44. Sufficient separation is required between the re-imaged pupil plane 48 and the refocusing lens group 44 so that a beamsplitter 132 may be inserted. The beamsplitter 132 creates the illumination pupil 46 and the collection pupil 48 which may then be manipulated to operate the optical system in various modes of operation. Typically, the illumination would be supplied by a broad band bright field source.

The intermediate focus lens group 40 may be made of two or more lens elements so as to correct color, spherical, and coma aberrations. In the illustrated embodiment, two lenses form focus lens group 40. Recollimating lens group 42 generally has the same lens elements, having the same prescription, as the lenses in group 40 but is oriented in reverse with respect to lens group 40. Refocusing lens group 44 generally includes a field flattener lens and corrects for other field aberrations. Both lens groups 42 and 44 generally correct for first and second-order coma aberrations and therefore contribute to a pupil with a low degree of aberrations. As generally known in the art, various combinations of the number, configuration, and prescription of the lenses may be used to implement the optical system of the present invention. Generally, the lenses that make up optical systems are determined by a trial and error approach, which is aided by optical design software programs. One of the many optical design software programs that may be used is Super OSLO (Super OSLO may be obtained through Sinclair Optics, Inc.). A smaller number of lenses is desired in order to minimize manufacturing costs.

The following prescription for the reimaging lens section 50 appears to work well:

| | LENS PRESCRIPTION DATA | | | |
|---|---|---|---|---|
| | KLA lens - 150X position | | | |
| SURFACE | RADIUS | THICKNESS | APERTURE RADIUS | GLASS |
| OBJ | — | 1.000000 | 75.000000 | AIR |
| 1 | — | 1.000000 | 74.928206 S | UV-SILICA |
| 2 | — | 891.114779 | 74.879951 S | AIR |
| 3 | 59.450385 | 5.000000 | 16.000000 | UV-SILICA P |
| 4 | −1.7457e+03 | 1.080258 | 16.000000 | AIR |
| 5 | 61.388090 | 4.677209 | 14.500000 | UV-CAF |
| 6 | 43.400397 | 3.999990 | 14.500000 | AIR |
| 7 | −67.584808 | 3.500000 | 13.500000 | UV-CAF |
| 8 | 29.084321 | 5.537136 | 13.000000 | AIR |
| 9 | −49.948010 | 4.500000 | 13.500000 | UV-SILICA P |
| 10 | −22.724739 | 0.500000 | 13.500000 | AIR |
| 11 | −24.764628 | 3.500000 | 14.000000 | UV-CAF P |
| 12 | 39.608522 | 1.542970 | 14.000000 | AIR |
| 13 | 35.011707 | 10.500000 | 15.000000 | UV-CAF P |
| 14 | −22.233419 | 0.398878 | 15.000000 | AIR |
| 15 | −21.589187 | 4.000000 | 15.000000 | UV-SILICA P |
| 16 | −48.079858 | 24.836695 | 15.000000 | AIR |
| 17 | 96.238996 | 3.000000 | 14.000000 | UV-SILICA P |
| 18 | 27.475806 | 0.999763 | 14.000000 | AIR |
| 19 | 28.179013 | 7.000000 | 14.000000 | UV-CAF P |
| 20 | −310.011303 | 45.000000 | 14.000000 | AIR |
| 21 | — | — | 10.000000 | UV-SILICA P |
| 22 | — | 45.000000 | 10.000000 | AIR |
| 23 | 132.955070 | 9.000000 | 15.000000 | UV-CAF P |
| 24 | −25.058065 | 0.811624 | 15.000000 | AIR |
| 25 | −22.198039 | 3.500000 | 14.000000 | UV-SILICA P |
| 26 | 55.712175 | 1.290303 | 15.000000 | AIR |
| 27 | 54.717907 | 12.000000 | 16.000000 | UV-CAF P |
| 28 | −26.795730 | 7.618909 | 16.000000 | AIR |
| 29 | −26.643042 | 4.000000 | 14.500000 | UV-SILICA P |
| 30 | −510.111639 | 60.796749 | 16.000000 | AIR |
| 31 | 174.813124 | 5.000000 | 22.000000 | UV-SILICA P |
| 32 | 194.464055 | 25.852159 | 22.000000 | AIR |
| 33 | 184.671264 | 7.000000 | 22.000000 | UV-CAF P |
| 34 | −130.812492 | 53.467151 | 22.000000 | AIR |
| 35 | −59.291287 | 6.000000 | 22.000000 | UV-SILICA P |
| 36 | −71.638774 | 118.805657 | 22.000000 | AIR |
| 37 | 142.188173 | 5.000000 | 20.000000 | UV-SILICA P |
| 38 | 43.172792 | 0.998466 | 20.000000 | AIR |
| 39 | 44.227329 | 8.000000 | 20.000000 | UV-CAF P |
| 40 | −345.075305 | 248.143934 | 20.000000 | AIR |
| 41 | 786.044822 | 5.000000 | 20.000000 | UV-SILICA P |
| 42 | 72.053664 | 2.000000 | 20.000000 | AIR |
| 43 | 218.116078 | 9.000000 | 20.000000 | UV-CAF P |
| 44 | −67.470371 | 75.000000 | 20.000000 | AIR |
| 45 | 43.226041 | 5.999955 | 15.000000 | UV-SILICA P |
| 46 | 19.461291 | 13.373050 | 13.500000 | AIR |
| 47 | −18.548485 | 9.999400 | 14.000000 | UV-SILICA P |
| 48 | −24.506234 | 1.000000 | 18.000000 | AIR |
| 49 | 45.511417 | 9.000000 | 21.000000 | UV-SILICA P |
| 50 | −246.999546 | 2.999903 | 21.000000 | AIR |
| AST | — | — | 17.179365 AS | AIR |
| 52 | 23.470481 | 8.193840 | 19.000000 | UV-SILICA P |

-continued

LENS PRESCRIPTION DATA

| | | | | |
|---|---|---|---|---|
| 53 | 50.619563 | 9.373014 | 19.000000 | AIR |
| 54 | −40.715354 | 4.999815 | 18.000000 | UV-SILICA P |
| 55 | −45.281976 | 5.467608 | 18.000000 | AIR |
| 56 | 250.620254 | 8.217996 | 14.000000 | UV-SILICA P |
| 57 | −65.552007 | 10.542322 | 14.000000 | AIR |
| 58 | −17.835746 | 3.000000 | 10.000000 | UV-SILICA P |
| 59 | −35.935016 | 0.100000 | 10.000000 | AIR |
| 60 | 19.875853 | 6.987670 | 8.000000 | UV-CAF P |
| 61 | −36.542971 | 0.100000 | 8.000000 | AIR |
| 62 | 70.500753 | 2.000000 | 6.000000 | UV-SILICA P |
| 63 | 5.178714 | 0.020000 | 4.000000 | AIR |
| 64 | 5.178714 P | 3.000000 | 4.000000 | UV-CAF P |
| 65 | −79.527343 | 7.000000 | 4.000000 | AIR |
| 66 | — | 9.328517 | 3.200000 | AIR |
| 67 | 94.992559 | 11.000000 | 57.000000 | UV-SILICA P |
| 68 | 73.371820 | 29.913468 | 49.000000 | AIR |
| 69 | 1.2105e+03 | 10.000000 | 44.000000 | UV-SILICA P |
| 70 | — | −10.000000 P | 44.000000 X | REFLECT |
| 71 | 1.2105e+03 P | −29.913468 P | 44.000000 | AIR |
| 72 | 73.371820 P | −11.000000 P | 49.000000 | UV-SILICA P |
| 73 | 94.992559 P | −9.328517 P | 57.000000 | AIR |
| 74 | 73.640257 | 9.328517 P | 58.000000 X | REFLECT |
| 75 | 94.992559 P | 11.000000 P | 57.000000 | UV-SILICA P |
| 76 | 73.371820 P | 29.913468 P | 49.000000 | AIR |
| 77 | 1.2105e+03 P | 10.000000 P | 44.000000 | UV-SILICA P |
| 78 | — P | 1.500000 | 44.000000 | AIR |
| IMS | — | — | 0.500375 S | |

*CONFIGURATION DATA

| TYPE | SN | CFG | QUALF | VALUE |
|---|---|---|---|---|
| TH | 16 | 2 | 0 | 45.783458 |
| NAO | 0 | 2 | 0 | 0.012500 |
| TH | 2 | 2 | 0 | 351.785675 |
| OBH | 0 | 2 | 0 | 57.240000 |
| NAO | 0 | 3 | 0 | 0.008182 |
| TH | 16 | 3 | 0 | 31.872397 |
| TH | 2 | 3 | 0 | 614.520711 |
| OBH | 0 | 3 | 0 | 75.350000 |
| TH | 2 | 4 | 0 | 206.584307 |
| OBH | 0 | 4 | 0 | 39.780000 |
| NAO | 0 | 4 | 0 | 0.017647 |
| TH | 16 | 4 | 0 | 62.379347 |
| TH | 2 | 5 | 0 | 296.470199 |
| TH | 16 | 5 | 9 | 50.820711 |
| NAO | 0 | 5 | 0 | 0.014063 |
| OBH | 0 | 5 | 0 | 50.000000 |
| TH | 16 | 6 | 0 | 19.999931 |
| NAO | 0 | 6 | 0 | 0.004500 |
| TH | 2 | 6 | 0 | 1.2369e+03 |
| OBH | 0 | 6 | 0 | 75.000000 |

Configuration #1 is 150X, #2 is 72X, #3 is 110X, #4 is 51X, #6 is 200X, and #5 is 64X Referring back to FIG. 1, the beamsplitter 132 is positioned at the opposite end of the reimaging lens section 50 from the objective lens section 128 such that an illumination pupil 46 and a collection pupil 48 are created. The optical system illustrated in FIG. 1 is capable of deep ultraviolet, broadband operation in various modes of operation such as bright field, ring darkfield, full-sky illumination and laser darkfield. The optical system is configurable to operate in the various modes of operation by inserting various obstructions in the illumination pupil 46 and the collection pupil 48 so that certain light rays within the system are prevented from reaching either the specimen or the final image. The re-imaged pupil plane 48 is readily accessible since it is not located within any of the lens sections (e.g., the objective lens section 128). The accessibility of pupil plane 48 advantageously allows for the optical system of the present invention to be easily configured for various test modes. Without the reimaging lens section 50, configuring the optical system for various test modes would be very difficult. The difficulty arises from the fact that without a re-imaged pupil, configuring the optical system would require access to the system pupil, which is generally within the objective lens section 128. Accessing the system pupil within the objective lens section is undesirable since this increases the likelihood that the individual lenses of the objective lens section 128 may be moved out of properly aligned orientations. Any physical manipulation of the objective lens section 128 also increases the likelihood that foreign particles, such as dust, may be introduced into the objective lens section. Ideally, it would be desirable to minimize the amount that the objective lens section 128 needs to be manipulated to maintain its integrity. The reimaging lens section 50 allows the optical system illustrated in FIG. 1 to operate in a telecentric mode for ring darkfield and full-sky illumination test modes.

The optical system of the present invention can operate under various modes to capture images, which illustrate different aspects and characteristics of a specimen. Most commonly, brightfield operation is performed when no obstructions are placed at either the illumination pupil 46 and the collection pupil 48.

Ring darkfield mode is performed by including an obstruction in the center portion of the illumination pupil 46 and by obstructing the outer perimeter of the collection pupil 48 such that no direct light passes through the optical system from the illuminator to the detector. In this manner, the resulting image is from the center portion of the numerical aperture, and the light from the unblocked outer portion of the illumination pupil illuminates the object. Ring darkfield is effective in maximizing the signal from corners, edges and defects and minimizing the direct signal from planar surfaces and variations in the signal from oxide coated planar surfaces, which is a noise source affecting defect detection. Thus, ring darkfield mode increases the contrast of an image, which allows for more efficient defect detection.

Full-sky mode, a mixture of brightfield and ring darkfield modes, is performed by placing a variable filter on the perimeter of the illumination pupil 46 and by blocking the perimeter of the collection pupil 48. The variable filter can be adjusted to control the amount of light that passes through the outer portion of the illumination pupil 46. By adjusting the variable filter, the ratio of the amount of light passing through the variable filter versus the amount of light passing around the variable filter can be adjusted so that the signal from noise sources can be minimized. Full-sky test mode is effective for minimizing noise from grainy surfaces.

Laser darkfield is performed by illuminating the wafer with a coherent monochromatic light source (e.g., a laser) using approximately collimated light. The polarization state of the illumination can be varied between P, S, or circularly polarization to maximize the signal to noise ratio for the particular structure and process layer. The elevation and azimuth angle of illumination can be fixed or variable depending upon the nature of the structure on the surface and the types of defects desired to be detected. This illumination may be directed through the lens or external to it depending upon the mechanical clearances available and elevation angles desired. The light is usually incident from outside of the numerical aperture of the collection lens, however, in the case of a very high NA lens, it may be brought in through either the whole lens, or a part of it. If the light is incident within the collection NA, the light reflecting from the structures must be blocked to prevent direct illumination of the detector. Light can be incident on the wafer in a flood situation in which the entire field of view is uniformly illuminated. In this case, light scattering from wafer structures is collected by the lens and imaged on the detector. For periodic surface structures, the light diffracts in a particular set of angles and can be blocked out with a filter apparatus located at the Fourier plane of the collection lens if the light is incident in an approximately collimated manner.

The collection pupil plane 48 also provides a Fourier plane used for Fourier filtering the collected scattered light from periodic structures. Fourier filtering may be used to detect errors in a specimen having a regularly repeating pattern upon its surface (e.g., an array of structures on a semiconductor wafer). The present invention allows for Fourier filtering because the Fourier plane is now outside of the objective lens section 128 and therefore can be manipulated as required. The image quality at the Fourier plane can now be adjusted to have good quality, lie on a flat surface, and be distortion free, thereby yielding small diffraction spots from the repeating periodic structures on the surface. Generally, in Fourier filtering, the repeating patterns on the surface of the specimen cause the light to diffract in approximately uniform angles at regularly spaced intervals. This diffraction is defined by the diffraction equation:

$$N \cdot \lambda = d \cdot \sin(\varphi),$$ where $n$ is the order of diffraction, $\lambda$ is the wavelength, $d$ is the pitch of the repetitive pattern and $\varphi$ is the diffracted angle.

The diffracted light is then focused at the Fourier plane into a regular array of spots of light. By blocking out these spots of light with a filter, only randomly scattered light will pass through the Fourier plane and on to the detector. The detection of this scattered light indicates a defect in the specimen since defects in the specimen cause the light to scatter uniformly and very little of their signal is blocked by the Fourier filter. Generally, a laser having a wavelength in the spectral range of the objective lens is used to perform Fourier filtering in the UV mode. For example, lasers having wavelengths in the range of approximately 190–370 nm may be used.

Figure 5:
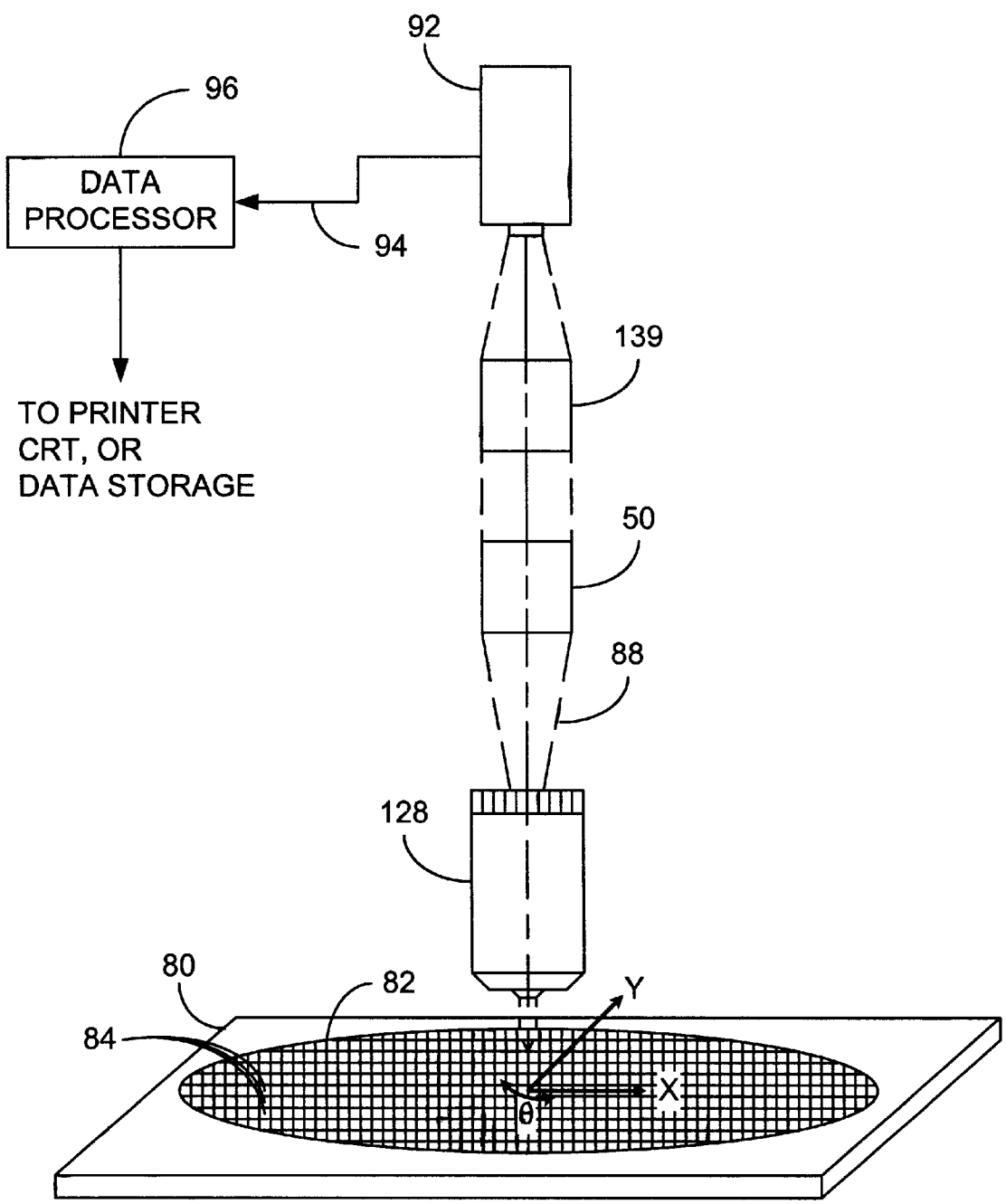
FIG. 5 illustrates a schematic side view of an optical system of the present invention, according to one embodiment, in an application for the inspection of semiconductor wafers.

FIG. 5 is a schematic side view of the optical system of the present invention in an application for the inspection of semiconductor wafers. Platform 80 holds a wafer 82 that is composed of several integrated circuit dice 84. The catadioptric objective lens section 128 transfers the light ray bundle 88 to the reimaging lens section 50. After passing through the reimaging lens section 50, the light ray bundle 88 passes through the zoom lens section 139 which produces an adjustable image received by the detector 92. The detector 92 converts the image to binary coded data and transfers the data over cable 94 to data processor 96.

While this invention has been described in terms of several preferred embodiments, there are alteration, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A broad spectral region catadioptric optical system comprising:

a catadioptric objective lens section aligned along an optical path of the optical system;

a reimaging lens section which is aligned along the optical path, the reimaging lens section configured to create a re-imaged pupil; and a zoom lens section which is aligned along the optical path, the zoom lens section configured to zoom or change magnification, wherein the reimaging lens section is positioned proximate to and between both the catadioptric objective lens section and the zoom lens section.

2. The system as recited in claim 1 wherein the re-imaged pupil is accessible separately from the catadioptric objective lens section.

3. The system as recited in claim 1 wherein the re-imaged pupil is accessible separately from the reimaging lens section and the zoom lens section.

4. The system as recited in claim 1 wherein the re-imaged pupil is located between the reimaging lens section and the zoom lens section.

5. The system as recited in claim 1 wherein the reimaging lens section includes, an intermediate focus lens group that includes at least one lens configured to focus light within the system into an intermediate focus; and a recollimating lens group that includes at least one lens configured to recollimate the light which was focused into the intermediate focus;

a refocusing lens group that includes at least one lens configured to generate the re-imaged pupil.

6. The system as recited in claim 1 wherein the catadioptric objective lens section includes, a focusing lens group including a plurality of lens elements, each lens element of the focusing lens group having lens surfaces disposed at first predetermined positions along the optical path of the system, the first predetermined positions selected to focus ultraviolet light at an intermediate image within the system, each of the lens surfaces having curvatures also selected to focus ultraviolet light at the intermediate image within the system;

a field lens group with a net positive power aligned along the optical path proximate to the intermediate image, the field lens group including a plurality of lens elements with different dispersions, each of the lens elements within the field lens group having lens surfaces disposed at second predetermined positions; and a catadioptric relay group, including a combination of at least two reflective surfaces and at least one refractive surface disposed at third predetermined positions, the reflective and refractive surfaces having curvatures selected to form a real image of the intermediate image.

7. The system as recited in claim 1 further comprises a beamsplitter configured to manipulate the re-imaged pupil so to create an illumination pupil and a collection pupil.

8. The system as recited in claim 7 wherein the system is configured to operate in ring darkfield illumination mode.

9. The system as recited in claim 7 wherein the system is configured to operate in full-sky illumination mode.

10. The system as recited in claim 7 wherein the system is configured to operate in laser darkfield illumination mode.

11. The system as recited in claim 7 wherein the system is configured to operate in brightfield illumination mode.

12. The system as recited in claim 7 further comprising:

an illumination aperture configured to regulate an amount of radiation which passes through the illumination pupil; and a collection aperture configured to regulate an amount of radiation which passes through the collection pupil.

13. The system as recited in claim 12 wherein the illumination aperture is configured to restrict at least some of the radiation from passing through the center of the illumination pupil.

14. The system as recited in claim 12 wherein the illumination aperture is configured to restrict all of the radiation from passing through the center of the illumination pupil.

15. The system as recited in claim 12 wherein the collection aperture is configured to restrict radiation from passing through the outer edges of the collection pupil.

16. The system as recited in claim 1 further comprising:

a detector array which can receive an image over a range of ultraviolet wavelengths, the image being received from the zoom lens section; and a broadband UV radiation source which directs an ultraviolet wavelength band of radiation into the system.

17. The system as recited in claim 1 wherein the catadioptric objective lens section is fused silica and calcium fluoride.

18. The system as recited in claim 1 wherein the reimaging lens section is fused silica and calcium fluoride.

19. The system as recited in claim 1 wherein the zoom lens section includes a single zoom lens.

20. The system as recited in claim 1 wherein the zoom lens section includes at least one tube lens.

21. A reimaging lens section having refractive and reflective surfaces characterized by the following dimensional values:

| SURFACE | RADIUS | THICKNESS | APERTURE RADIUS | GLASS |
|---|---|---|---|---|
| OBJ | — | 1.000000 | 75.000000 | AIR |
| 1 | — | 1.000000 | 74.928206 S | UV-SILICA |
| 2 | — | 891.114779 | 74.879951 S | AIR |
| 3 | 59.450385 | 5.000000 | 16.000000 | UV-SILICA P |
| 4 | −1.7457e +03 | 1.080258 | 16.000000 | AIR |
| 5 | 61.388090 | 4.677209 | 14.500000 | UV-CAF |
| 6 | 43.400397 | 3.999990 | 14.500000 | AIR |
| 7 | −67.584808 | 3.500000 | 13.500000 | UV-CAF |
| 8 | 29.084321 | 5.537136 | 13.000000 | AIR |
| 9 | −49.948010 | 4.500000 | 13.500000 | UV-SILICA P |
| 10 | −22.724739 | 0.500000 | 13.500000 | AIR |
| 11 | −24.764628 | 3.500000 | 14.000000 | UV-CAF P |
| 12 | 39.608522 | 1.542970 | 14.000000 | AIR |
| 13 | 35.011707 | 10.500000 | 15.000000 | UV-CAF P |
| 14 | −22.233419 | 0.398878 | 15.000000 | AIR |
| 15 | −21.589187 | 4.000000 | 15.000000 | UV-SILICA P |
| 16 | −48.079858 | 24.836695 | 15.000000 | AIR |
| 17 | 96.238996 | 3.000000 | 14.000000 | UV-SILICA P |
| 18 | 27.475806 | 0.999763 | 14.000000 | AIR |
| 19 | 28.179013 | 7.000000 | 14.000000 | UV-CAF P |
| 20 | −310.011303 | 45.000000 | 14.000000 | AIR |
| 21 | — | — | 10.000000 | UV- |
| 22 | — | 45.000000 | 10.000000 | AIR |
| 23 | 132.955070 | 9.000000 | 15.000000 | UV-CAF P |
| 24 | −25.058065 | 0.811624 | 15.000000 | AIR |
| 25 | −22.198039 | 3.500000 | 14.000000 | UV-SILICA P |
| 26 | 55.712175 | 1.290303 | 15.000000 | AIR |
| 27 | 54.717907 | 12.000000 | 16.000000 | UV-CAF P |
| 28 | −26.795730 | 7.618909 | 16.000000 | AIR |
| 29 | −26.643042 | 4.000000 | 14.500000 | UV-SILICA P |
| 30 | −510.111639 | 60.796749 | 16.000000 | AIR |
| 31 | 174.813124 | 5.000000 | 22.000000 | UV-SILICA P |
| 32 | 194.464055 | 25.852159 | 22.000000 | AIR |
| 33 | 184.671264 | 7.000000 | 22.000000 | UV-CAF P |
| 34 | −130.812492 | 53.467151 | 22.000000 | AIR |
| 35 | −59.291287 | 6.000000 | 22.000000 | UV-SILICA P |
| 36 | −71.638774 | 118.805657 | 22.000000 | AIR |
| 37 | 142.188173 | 5.000000 | 20.000000 | UV-SILICA P |
| 38 | 43.172792 | 0.998466 | 20.000000 | AIR |
| 39 | 44.227329 | 8.000000 | 20.000000 | UV-CAF P |
| 40 | −345.075305 | 248.143934 | 20.000000 | AIR |
| 41 | 786.044822 | 5.000000 | 20.000000 | UV-SILICA P |
| 42 | 72.053664 | 2.000000 | 20.000000 | AIR |
| 43 | 218.116078 | 9.000000 | 20.000000 | UV-CAF P |
| 44 | −67.470371 | 75.000000 | 20.000000 | AIR |
| 45 | 43.226041 | 5.999955 | 15.000000 | UV-SILICA P |
| 46 | 19.461291 | 13.373050 | 13.500000 | AIR |
| 47 | −18.548485 | 9.999400 | 14.000000 | UV-SILICA P |
| 48 | −24.506234 | 1.000000 | 18.000000 | AIR |
| 49 | 45.511417 | 9.000000 | 21.000000 | UV-SILICA P |
| 50 | −246.999546 | 2.999903 | 21.000000 | AIR |
| AST | — | — | 17.179365AS | AIR |
| 52 | 23.470481 | 8.193840 | 19.000000 | UV-SILICA P |
| 53 | 50.619563 | 9.373014 | 19.000000 | AIR |

-continued

| SUR-FACE | RADIUS | THICK-NESS | APERTURE RADIUS | GLASS |
|---|---|---|---|---|
| 54 | −40.715354 | 4.999815 | 18.000000 | UV-SILICA P |
| 55 | −45.281976 | 5.467608 | 18.000000 | AIR |
| 56 | 250.620254 | 8.217996 | 14.000000 | UV-SILICA P |
| 57 | −65.552007 | 10.542322 | 14.000000 | AIR |
| 58 | −17.835746 | 3.000000 | 10.000000 | UV-SILICA P |
| 59 | −35.935016 | 0.100000 | 10.000000 | AIR |
| 60 | 19.875853 | 6.987670 | 8.000000 | UV-CAF P |
| 61 | −36.542971 | 0.100000 | 8.000000 | AIR |
| 62 | 70.500753 | 2.000000 | 6.000000 | UV-SILICA P |
| 63 | 5.178714 | 0.020000 | 4.000000 | AIR |
| 64 | 5.178714P | 3.000000 | 4.000000 | UV-CAF P |
| 65 | −79.527343 | 7.000000 | 4.000000 | AIR |
| 66 | — | 9.328517 | 3.200000 | AIR |
| 67 | 94.992559 | 11.000000 | 57.000000 | UV-SILICA P |
| 68 | 73.371820 | 29.913468 | 49.000000 | AIR |
| 69 | 1.2105e +03 | 10.000000 | 44.000000 | UV-SILICA P |
| 70 | — | −10.000000P | 44.000000X | REFLECT |
| 71 | 1.2105e +03P | −29.913468P | 44.000000 | AIR |
| 72 | 73.371820P | −11.000000P | 49.000000 | UV-SILICA P |
| 73 | 94.992559P | −9.328517P | 57.000000 | AIR |
| 74 | 73.640257 | 9.328517P | 58.000000X | REFLECT |
| 75 | 94.992559P | 11.000000P | 57.000000 | UV-SILICA P |
| 76 | 73.371820P | 29.913468P | 49.000000 | AIR |
| 77 | 1.2105e +03P | 10.000000P | 44.000000 | UV-SILICA P |
| 78 | — P | 1.500000 | 44.000000 | AIR |
| IMS | — | — | 0.500375 S | |

22. A method of using a broad spectral region catadioptric optical system which has a catadioptric objective lens section, a reimaging lens section and a zoom lens section to obtain an image of a specimen, the reimaging lens section being positioned proximate to and between both the catadioptric objective lens section and the zoom lens section, the method comprising:

providing a beam splitter between the reimaging lens section and the zoom lens section such that the beam splitter creates a collection pupil and an illumination pupil, the collection pupil positioned between the reimaging lens section and the zoom lens section, the reimaging lens section, the zoom lens section and the collection pupil being aligned along an optical pathway, the illumination pupil positioned outside of the optical pathway; and directing radiation from a radiation source so that the radiation passes through the illumination pupil and the collection pupil, the illumination pupil and the collection pupil being part of the optical system.

23. The method as recited in claim 22 wherein the illumination pupil and the collection pupil are configured to operate in ring darkfield illumination mode.

24. The method as recited in claim 22 wherein the illumination pupil and the collection pupil are configured to operate in full-sky illumination mode.

25. The method as recited in claim 22 wherein the illumination pupil and the collection pupil are configured to operate in laser darkfield illumination mode.

26. The method as recited in claim 22 wherein the illumination pupil and the collection pupil are configured to operate in brightfield illumination mode.

27. The method as recited in claim 22 further comprising positioning an illumination aperture proximate to the illumination pupil such that at least some of the radiation is restricted from passing through the center of the illumination pupil.

28. The method as recited in claim 22 further comprising positioning an illumination aperture proximate to the illumination pupil such that at least some of the radiation is restricted from passing through the outer portion of the illumination pupil.

29. The method as recited in claim 22 further comprising positioning a collection aperture proximate to the collection pupil such that radiation is restricted from passing through the outer edges of the collection pupil.

30. The method as recited in claim 22 wherein the directing operation directs an ultraviolet wavelength band of radiation, and the radiation source is a broadband ultraviolet radiation source.

\* \* \* \* \*